Aug. 7, 1956  H. C. LUDWIG  2,758,186
DEEP PENETRATION GAS SHIELDED ARC WELDING PROCESS
Filed Oct. 21, 1952  4 Sheets-Sheet 1

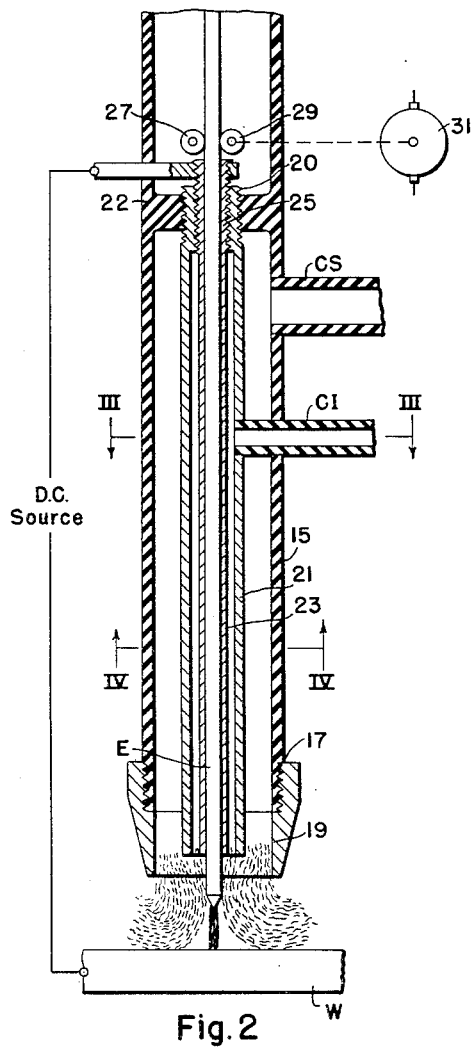
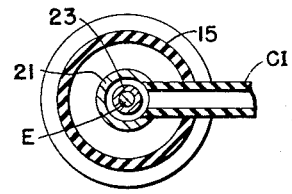
Fig. 3
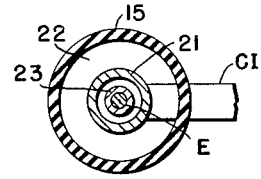
Fig. 4.
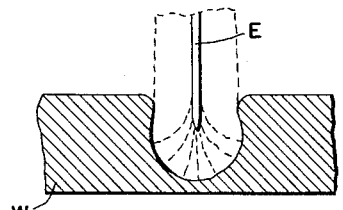
Fig. 5.

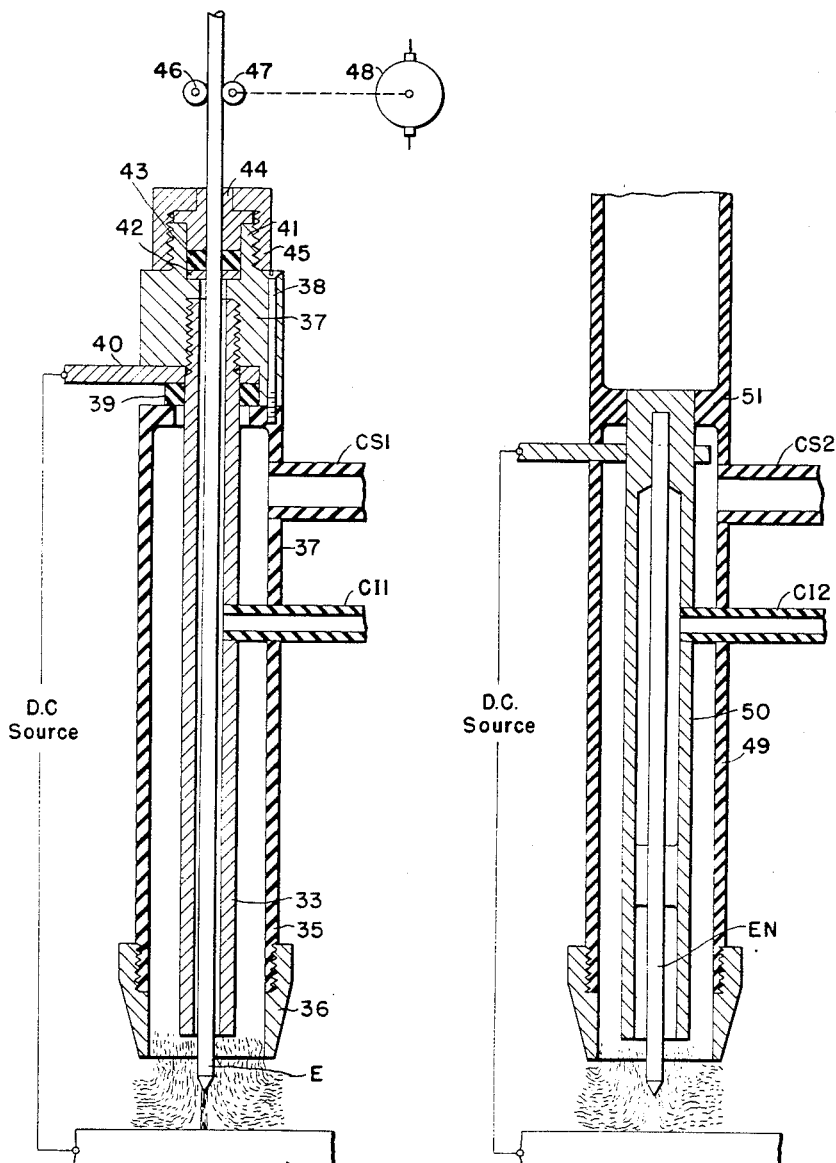

Aug. 7, 1956    H. C. LUDWIG    2,758,186
DEEP PENETRATION GAS SHIELDED ARC WELDING PROCESS
Filed Oct. 21, 1952                     4 Sheets-Sheet 4

WITNESSES:
John E. Hensley
Leon M. Garman

INVENTOR
Howard C. Ludwig
BY
Hymen Diamond
ATTORNEY

United States Patent Office 2,758,186
Patented Aug. 7, 1956

2,758,186

DEEP PENETRATION GAS SHIELDED ARC WELDING PROCESS

Howard C. Ludwig, Pittsburgh, Pa., assignor to Westinghouse Electric Corporation, East Pittsburgh, Pa., a corporation of Pennsylvania Application October 21, 1952, Serial No. 316,005

13 Claims. (Cl. 219—10)

My invention relates to arc welding and arc-cutting apparatus and has particular relation to apparatus of the inert gas-shielded type.

Among the arc welding processes which are in wide use at the present time is arc welding with a consumable or a non-consumable electrode operating in a shield of an inert gas. In consumable-electrode welding, the arc is produced between the filler metal and the work and in non-consumable welding the arc is produced between an electrode of tungsten or a similar material and the work. In non-consumable welding, the work may be welded directly or filler metal may be fed into, and melted by, the arc. With the inert-gas shielded arc welding, sound welds are produced but it has the disadvantage that the filler metal fails to penetrate deeply into the work being welded, that is, the region of the welded work which consists of a solution of the filler metal and the original metal, is relatively shallow.

Shallow welds are undesirable in many situations, particularly where the cross section of the work is relatively heavy. They are also undesirable in situations where a T-section body is to be produced by welding one plate which constitutes the stem of the T to another plate at right angles to it. Occasionally in producing such welds, it is desirable that the welded section extend completely through the joint from one side to the other of the stem plate. Where shallow welds are produced, this object cannot be achieved. Penetrating welds are also desirable where two bodies having rectangular (not beveled) ends are to be butt welded.

In accordance with the teachings of the prior art, it has been the practice in joining workpieces of heavy section or in making T joints to pass over the work several times with the welding electrode. While this practice results in satisfactory welds, it has the disadvantage that it requires that the weld produced by any pass be cleaned before the next pass is made. This increases the cost of welding.

It is, accordingly, an object of my invention to provide inert-gas shielded arc welding apparatus for producing deeply penetrating welds of sound structure.

A further object of my invention is to provide a method of arc welding in an inert gas shield in the practice of which sound welds having deep penetration shall be produced.

Another object of my invention is to provide a wire guide or collet for arc welding which shall lend itself to the production of sound welds having deep penetration.

A specific object of my invention is to provide inert-gas shielded consumable-electrode arc welding apparatus with which deeply penetrating welds shall be produced and in the use of which the filler metal shall be delivered in a fine spray rather than in droplets.

An incidental object of my invention is to provide arc-cutting apparatus particularly suitable for cutting oxidation-resistant alloys such as stainless steel.

In accordance with the specific aspects of my invention, I provide welding apparatus including a welding electrode, operating within a relatively high-velocity gas stream adjacent to it. This gas stream and the tip of the electrode are enclosed within a shield of inert gas. The high velocity stream may be called the inner stream. I have found that with this apparatus penetrating welds are produced even with heavy gauge work.

While this invention is based on experiment and not speculation, it is my belief that the explanation of its advantages lies in the digging action of the inner stream. In welding in accordance with my invention, an arc which is produced between the electrode and the work softens the work and, in addition, melts the electrode, if it is of the consumable type, or the filler fed into the arc, if the electrode is of the non-consumable type, and ionizes the gas both in the inner stream and in the shielding stream. The gas in the inner stream is projected against the softened and melting surface of the work and tends to bore into the work, rapidly penetrating it. The arc and the filler metal are thus projected into the work, and a deeply penetrating weld is produced. Of course, in presenting this explanation, it is not my intention that my invention or its scope be bound or limited by this explanation in any way.

I have also found that in welding in accordance with my invention as described above with a consumable electrode that the filler metal is deposited in a spray rather than in relatively large droplets. This effect appears to be caused by the tendency of the high-velocity inner stream to reduce substantially the interfacial tension at the molten electrode tip so that minute rather than large particles of molten metal are projected from the tip. The diffuse transfer of metal thus produced militates against short circuiting by droplets of metal and tends to reduce turbulence in the arc. But there is a counteracting tendency to produce turbulence which I will now describe.

In the practice of my invention, it is desirable that the velocity of the inner stream be as high as practicable, but consideration must be given to the relationship between this inner stream and the shielding stream. Because of its high velocity compared to the velocity of the shielding stream, the inner stream tends to suck the gas from the shielding stream into its path. This sucking effect is reduced by the diffusion of minute metal particles in the inner stream in consumable-electrode welding, but the overall tendency of a high-velocity inner stream is to produce gas turbulence and thus an unstable arc. It is accordingly important in the practice of my invention to maintain the relationship between the velocity of the inner stream and the velocity of the shielding stream such that appreciable turbulence by reason of the sucking effect of the inner stream is avoided and this is an important feature of my invention.

The inner stream and the shielding stream may each be composed of different gases but an extended series of experiments which I have conducted reveal that certain gas combinations are far superior to others, particularly for the welding of certain materials. I have found that an inner stream of oxygen flowing in a shielding stream of pure argon produces highly satisfactory results particularly in the welding of steel of the type disclosed in my application Serial No. 286,348, filed May 6, 1952, and assigned to the Westinghouse Electric Corporation, with a consumable electrode. The oxygen may flow at a relatively low volumetric rate. The electrode should preferably be of the type including a deoxidizing agent as disclosed in said pending application. The inner stream and the shielding stream may both be composed of pure argon and the shielding stream of an oxygen-argon mixture of the type disclosed in my said copending application. The inner stream may be composed of helium and the outer of argon or vice versa. Other inert gases may be used in different combinations.

The polarity may be either straight or reverse in welding in accordance with my invention, but there are situations in which one is to be preferred to the other. Thus I have produced excellent weld deposits with low-carbon steel operating at straight polarity with the inner stream oxygen and the outer stream pure argon.

As has been pointed out, my invention in its specific aspects is intimately related to inert-gas shielded arc welding. In its broadest aspects, my invention is applicable to arc cutting. It is particularly suitable for arc cutting of oxidation-resistant alloys and metals such as stainless steel, for example. In arc cutting different combinations of gases, as discussed above, may be used. The arc electrode may be either electrically positive or negative. For many purposes it is preferred that the electrode be negative and the work positive. In this way, a wide cathode swath on the work is avoided and relatively narrow cut may be produced.

The novel features that I consider characteristic of my invention have been discussed generally above. The invention itself, however, both as to its organization and its method of operation, together with additional objects and advantages thereof, will best be understood from the following description of specific embodiments when read in connection with the accompanying drawings, in which:

Fig. 2 is a view in section, showing the important components of apparatus in accordance with my invention;

Fig. 3 is a section taken along line III—III of Fig. 2;

Fig. 4 is a section taken along IV—IV of Fig. 2;

Fig. 5 is a diagrammatic view illustrating the operation of my invention;

Fig. 6 is a view in section of the essential portions of apparatus in accordance with a modification of my invention;

Fig. 7 is a view in section of apparatus in accordance with another modification of my invention;

Figure 1:
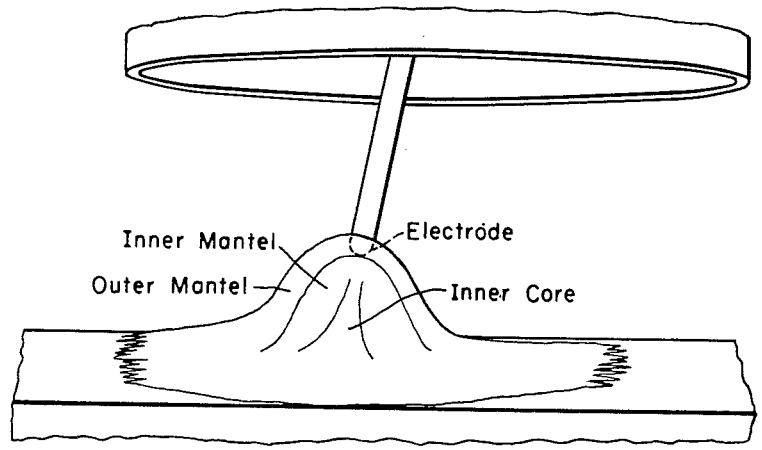
Figure 1 is a pictorial view of an inert-gas shielded arc of the prior art type.

Fig. 1 is an ink copy of an actual photograph of an arc produced with prior art apparatus. This arc was produced between a consumable electrode and work of the same material as the electrode, the arc operating in a shield of argon gas. The photograph shows that the arc is of composite structure, consisting of an inner luminous mantle having the shape of a probability curve and an outer luminous mantle of the same shape. Between the two mantles, there is a dark space. Within the inner mantle, there is a highly luminous inner core. The inner and outer mantles are made up of ionized argon atoms, which are in the process of recombining. The dark space between the inner and outer mantles is a region in which ionization rather than recombination of the ionized atoms is taking place. The inner core includes not only ionized argon atoms but also particles of the metal projected from the electrode tip and ionized atoms of the metal which are in the process of recombining.

In accordance with my invention, an inner high-velocity gas stream is projected along the inner core and causing this core to penetrate deeply into the metal. Naturally, the inner stream affects the components of the arc as shown in Fig. 1. The metal in the inner core is subdivided into minute particles and the path of the flow of the gas in the mantles and the dark space is changed by the sucking action of the inner stream.

This object of my invention is accomplished with the apparatus shown in Figs. 2 through 4 of my invention. This apparatus is called a wire guide in the art and includes an outer cylinder 15 provided with facilities (not shown) by which it may be mounted or held in the region of work W to be welded. This cylinder is threaded at its tip 17, and a nozzle 19 having a converging outer surface in the form of a frustum of a cone is screwed to the tip 17. The outer cylinder 15 is provided with an inlet channel CS above the tip 17 through which the shielding gas stream may be transmitted.

Within the outer cylinder 15, an inner cylinder 21 is mounted. The inner cylinder is provided with an elongated extension 20 threaded internally and externally. This extension is screwed into an elongated ring 22 of insulating material. The inner cylinder 21 projects into the nozzle 19 and also includes a channel CI through which an inner gas stream may be transmitted.

Within the inner cylinder 19, a sleeve 23 is mounted. This sleeve 23 is threaded at one end and screws into the elongated internal thread of the extension 20. The sleeve 23 is of such inside diameter as to permit a consumable welding electrode E which supplies the filler metal to be transmitted through it. The sleeve 23 is held in a closely fitting extension 25 of the inner cylinder 21. The electrode wire E may be fed through the sleeve 23 by rollers 27 and 29, 29 being driven by a motor 31.

The inner cylinder 21 and the sleeve 23 are so dimensioned that there is an annular space of relatively small width between the sleeve 23 and the inner cylinder 21. Gas transmitted through the channel CI connected to the inner cylinder flows through the annular space and, as it leaves this space within the nozzle, hugs the electrode closely. Gas transmitted through the channel CS in the outer cylinder 15 flows through an annular space between the outer and inner cylinders 15 and 21 and encloses and shields the inner gas stream and the tip of the electrode E. The flow of gas away from the tip of electrode E through the inner cylinder is prevented by the long screwed joint between the sleeve 23 and the extension 20. Gas flow away from the electrode tip through the outer cylinder 15 is prevented by the ring 22. If desirable, packing material (a rubber gasket for example) may be provided on one side of the extension 20 and the ring 22.

Between the work W and the electrode E, a potential is impressed from a suitable source which is connected at one terminal to the sleeve 23 and at the other terminal to the work. The diameter of the welding electrode E is slightly smaller than the inside diameter of the sleeve 23 and the electrode makes friction contact with the sleeve as it slides through the sleeve. The potential is preferably of the direct-current type and is poled in a manner governed by the materials being welded and the gases supplied through the channels CS and CI. When a stabilizing effect as disclosed in my application Serial No. 286,348 is not introduced, the work W is usually negative and the electrode E is positive (reverse polarity). Where a stabilizing effect is introduced, the work W is preferably positive and the electrode E negative (straight polarity). The potential may also be of the alternating-current type, and in such an event, it is also desirable that a stabilizing effect be introduced.

In the practice of my invention, different gas combinations are transmitted through the inner and outer cylinders 23 and 21, respectively. A preferred combination is an inner stream of oxygen and an outer or shielding stream of pure argon. Other combinations are presented in the following tables:

| Outer Stream | Inner Stream |
| --- | --- |
| Argon. | Argon. |
| Argon. | Helium. |
| Argon. | Oxygen. |
| Helium. | Helium. |
| Helium. | Argon. |
| Helium. | Oxygen. |
| Argon-Oxygen Mixture (as disclosed in application 286, 348). | Argon. |
| Argon-Oxygen Mixture. | Helium. |
| Argon-Oxygen Mixture. | Oxygen. |

In addition, there may be still further combinations such as an inert gas in the shielding stream and carbon monoxide, carbon dioxide or nitrogen in the inner stream. This combination is to be preferred for cutting.

The inner stream is preferably projected through the inner cylinder 23 at a substantially higher velocity than the shielding stream. In practice, it is desirable for this reason that the channel through which the inner stream flows should be as narrow as practicable. The inner stream exerts a sucking action on the shielding stream and if this action is excessive the shielding effect of the shielding stream may be reduced or destroyed and turbulence produced in the gas pattern. The velocity should not be so high as to produce marked turbulence.

When the gas is flowing properly through the cylinders 21 and 23, an arc is struck between the electrode E and the work W in the usual manner, and the work and the electrode are softened and melted by the heat of the arc. As shown in Fig. 5, the inner gas stream bores into the soft metal at the work, permitting the arc to penetrate. The inner stream also causes melted metal to be projected from the electrode in the form of a fine spray. A sound weld of deep penetration is thus produced.

The apparatus shown in Fig. 6 is a welding-gun head or wire guide which does not include an inner cylinder such as 21 of Fig. 1. The electrode sleeve 33 is provided with a gas inlet channel CI1 through which gas is projected directly along the sleeve. There is an outer cylinder 35 flanged at one end which is composed of insulating material, has a gas inlet channel CS1 and carries the nozzle 36 at its other end. The sleeve 33 is supported by a stud 37 into which it is screwed and is held by bolts 38 against the outer cylinder 35, the sleeve projecting axially into the cylinder 35. A packing gland 39 and a connector 40 are compressed between the stud 37 and the opening in the flange of the outer cylinder. The stud is screwed on tightly so that the gland 39 is compressed and prevents the flow of gas delivered through channel CS1 in a direction away from the electrode tip.

The stud 37 has a threaded stem 41 defining a hollow space in which a metal washer 42 and a rubber gland 43 are disposed. A second stud 44 which is flanged is pressed against the rubber gland by a cup-shaped nut 45 which screws onto the thread on the stem and compresses the gland 43. The electrode E passes through the gland 43 and the washer 42 into the sleeve 33. This electrode is driven through rolls 46 and 47 by motor 48. It is gripped tightly by the gland 43 and thus cooperates with the gland to prevent gas introduced in channel CI1 from flowing away from the electrode tip. The electrode E is not strictly linear and engages the inner wall of the sleeve 33 at numerous points making electrical contact with the sleeve 33 and thus with the connector 40.

The modification of my invention shown in Fig. 6 has the advantage that the inner stream of gas is projected in intimate contact with the electrode and, thus, is highly effective in producing a penetrating weld.

The apparatus shown in Fig. 7 discloses a collet similar to the wire guides disclosed in Figs. 2 to 6. In this case, however, a conducting electrode holder 50 is provided within an outer cylinder 49 of insulating material, and is held by a ring 51 within this cylinder. The electrode holder is provided with a gas channel CI2 through which the inner stream flows. The holder has a closed extension into which the non-consumable electrode EN is secured and this extension prevents gas from flowing in a direction away from the electrode tip. An inner stream of gas is thus projected in intimate contact with the arc, and highly effective welding may be carried out. A shielding gas stream is supplied through channel CS2 in the cylinder 49 and is prevented from flowing in a direction away from the electrode tip by ring 51.

The arrangement shown in Fig. 7 is also suitable for cutting, particularly the cutting of non-oxidizable materials.

Figure 8:
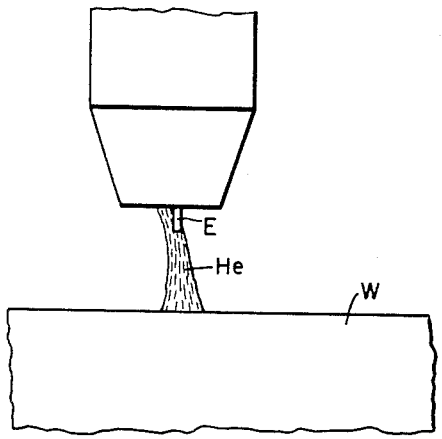
Figs. 8 and 9 are ink copies of Schlieren photographs showing the gas flow in the practice of my invention.
Figure 9:
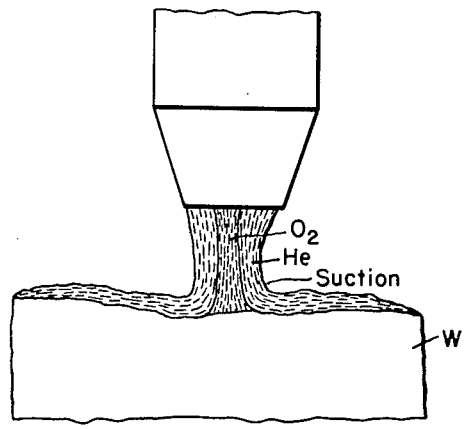
Figure 10:
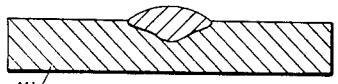
Figs. 10, 11, 12 and 13 are sketches of cross sections of actual filler-metal deposits produced in the practice of one embodiment of my invention.
Figure 11:
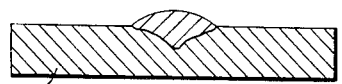
Figure 12:
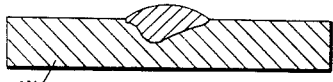
Figure 13:

Figs. 8 and 9 are copies of Schlieren photographs of apparatus of the type disclosed in Fig. 6 operating without an arc but with the gas flowing. In producing the photograph from which Fig. 8 was copied, the gas supplied through the electrode sleeve 33 was helium and the gas flowing through the outer cylinder was argon. Only the inner stream is shown, because the densities of the argon and the surrounding air are not sufficiently different to manifest the outer stream. It is to be noted that the inner stream flows relatively sharply along the line of the electrode E and would thus tend to produce a penetrating effect along this line.

In producing the photograph from which Fig. 9 was copied, the inner stream was oxygen and the outer stream helium. The sucking effect of the oxygen stream in the helium stream is shown by the curved contour of the helium stream. It is this sucking action which must be considered in determining the velocity of the inner stream.

Figs. 10, 11, 12 and 13 are sketches of cross sections of filler metal deposits produced in the practice of my invention with apparatus of the type shown in Fig. 6. These deposits were produced with work W of low carbon steel and a consumable welding electrode E of Mayari R metal. The composition of this electrode is:

0.10% carbon
  0.75% manganese
  0.30% silicon
  0.10% phosphorus
  0.50% nickel
  0.75% chromium
  0.50% copper
  Remainder iron.

Figure 14:
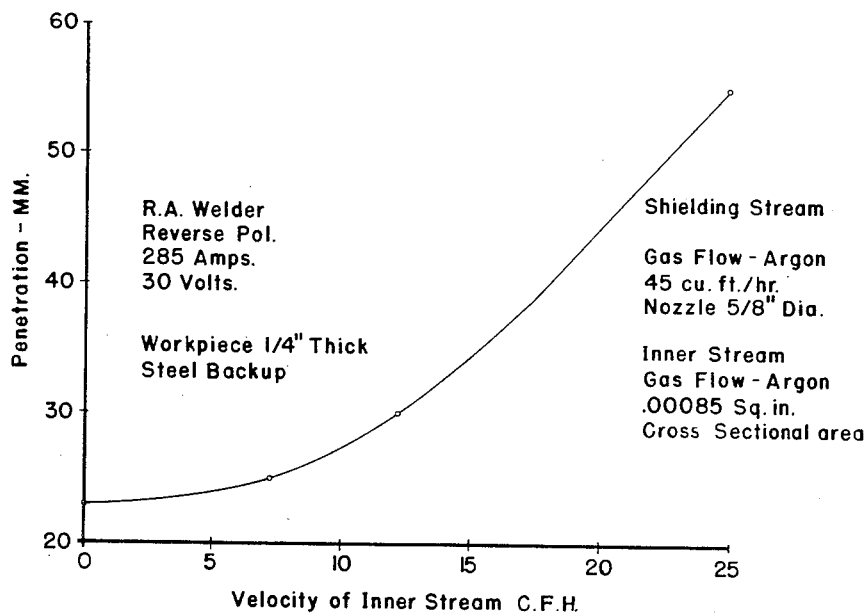
Fig. 14 is a graph based on Figs. 10 through 13.

The arc was produced at reverse polarity and the inner stream and outer streams were both composed of argon. In producing the different deposits shown in Figs. 10 through 13, the velocity of the gas flow of the inner stream was varied. The outer stream was supplied at 45 cubic feet per hour. The relationship between the deepest point of penetration (in millimeters) and the velocity of the inner gas stream (expressed as volumetric flow rate) is shown in Fig. 14. It is seen that the penetration increases with the velocity. However, it is my observation that the Fig. 13 deposit was not as sound as the others. The deterioration was caused by the turbulence produced by the interaction of the inner and outer streams. Thus, in the welding of low carbon steel with Mayari-R electrodes with argon in both streams, and the gas orifices having the dimensions given in Fig. 14, the volumetric flow rate of the inner stream should be of the order of 20 cubic feet per hour for a 45 cubic feet per hour flow of the shielding stream. It is to be understood that for each situation the volumetric rate of the gases must be set in accordance with the orifice dimensions of the welding gun and the character of the material being welded or cut.

Figure 15:
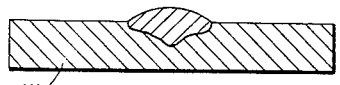
Fig. 15 is a sketch of a cross section of an actual filler-metal deposit produced in the practice of a modification of my invention.

The deposit shown in Fig. 15 was produced with the apparatus of the type shown in Fig. 6 (with orifice dimensions the same as is noted on Fig. 14) in low carbon steel with Mayari-R wire at straight polarity with the shielding stream pure argon and the outer stream oxygen flowing at about 4 cubic feet per hour. The shielding stream was supplied at 45 cubic feet per hour. The quality of this deposit is excellent; its penetration is highly satisfactory and its structure is sound.

While I have shown and described certain specific aspects of my invention, many modifications thereof are possible. My invention, therefore, is not to be restricted except insofar as is necessitated by the spirit thereof.

I claim as my invention:

1. A wire guide or collet for arc welding or cutting apparatus comprising an inner sleeve for supporting an electrode, a first gas path adjacent to said inner sleeve, a second gas path enclosing said first gas path, means for supplying gas to said first path and means for supplying gas to said second path, the said wire guide being characterized by the fact that the cross-sectional area of the inner path is as small as practicable so that the gas flowing through said inner path closely hugs said electrode and flows along the arc.

2. The method of arc welding work with a welding electrode which comprises impressing a potential to produce an arc between said electrode and said work, projecting an inner stream of oxygen along said electrode and projecting a shielding stream of an inert gas around said electrode and said inner stream.

3. Apparatus for arc welding work with a consumable electrode comprising a sleeve for guiding said electrode to said work, means for producing an arc between said electrode and said work, means for projecting an inner stream of gas through the space between said electrode and said sleeve and means for projecting an outer stream of gas around said arc and inner stream of gas.

4. The method of arc welding low carbon steel with a consumable electrode having a substantial composition of deoxidizing material which comprises impressing a potential between said electrode and said work to produce an arc, projecting an inner stream of oxygen along said electrode and projecting a shielding stream of inert gas around said electrode and said inner stream.

5. The method of arc welding work with a welding electrode which comprises impressing a potential to produce an arc between said electrode and said work, projecting an inner stream of gas containing oxygen along said electrode and projecting a shielding stream of an inert gas around said electrode and said inner stream.

6. A wire guide or collet for arc welding or cutting apparatus comprising an inner sleeve for supporting an electrode, said electrode projecting from the end of said guide adjacent the arc, a first gas path of annular cross section enclosing said inner sleeve and the electrode where it projects from said end, a second gas path of annular cross section enclosing said first gas path, means for supplying gas to said first path and means for supplying gas to said second path, the said guide being characterized by the fact that the cross-sectional area of said inner path is as small as practicable so that the gas flowing through said inner path closely hugs said inner sleeve and the portion of said electrode which projects from said end of said guide.

7. Apparatus for arc welding or cutting work with an electrode comprising in combination, means for producing an arc between said electrode and said work, means for projecting an inner stream of gas adjacent said arc and as near as practicable to said electrode and at a substantial velocity so that said inner stream impinges on the softened metal of said work in the region of said work where said arc impinges thereon and penetrates into said work in said region and means for projecting an outer stream of gas to shield said arc, said velocity of said inner stream being substantially higher than that of said outer stream but not so much higher as to produce turbulence by reason of suction effects.

8. The method of arc welding work with a welding electrode between which electrode and the work an arc is produced characterized by the steps of projecting a concentrated high-velocity stream of gas along said electrode so that said stream impinges on the softened metal of said work in the region where the arc impinges on said work to bore out the work in the region of the arc, the velocity of said stream being such, and the arc being maintained at each point of the work for a time interval such, that a sound penetrating weld is produced.

9. The method of cutting work with an arc produced between the electrode and the work characterized by the steps of projecting a concentrated high-velocity stream of gas along said electrode so that said stream impinges on the softened metal of said work in the region where the arc impinges on said work to bore out the work in the region of the arc and projecting a shielding stream of an inert gas around said high-velocity stream, the velocity of said high-velocity stream being such, and the arc being maintained at each point of the work for a time interval such, that the work is cut.

10. Apparatus according to claim 7 characterized by the fact that the inner stream is composed of helium and the outer stream of argon.

11. Apparatus according to claim 7 characterized by the fact that the inner stream is projected with a cross-sectional area as small as practicable.

12. The method according to claim 8 characterized by the fact that the gas in the stream along the electrode is one of the class including argon, helium and oxygen.

13. The method according to claim 9 characterized by the fact that the gas in the high velocity stream is one of the class including argon, helium, oxygen, and nitrogen.

References Cited in the file of this patent

UNITED STATES PATENTS

| Number | Name | Date |
|---|---|---|
| 857,247 | Menne | June 18, 1907 |
| 903,826 | Arsem | Mar. 17, 1908 |
| 904,482 | Howell | Nov. 17, 1908 |
| 1,911,033 | Nagashev | May 23, 1933 |
| 1,946,302 | Weller | Feb. 6, 1934 |
| 2,504,868 | Muller et al. | Apr. 18, 1950 |
| 2,522,482 | Olzak | Sept. 12, 1950 |